United States Patent
Su et al.

(10) Patent No.: US 12,159,201 B2
(45) Date of Patent: Dec. 3, 2024

(54) METHOD OF PROCEDURAL THRESHOLDS IN QAP-BASED FAULT TOLERANCE QUANTUM COMPUTATION

(71) Applicant: National Applied Research Laboratories, Hsinchu (TW)

(72) Inventors: Zheng-Yao Su, Hsinchu (TW); Ming-Chung Tsai, Hsinchu (TW)

(73) Assignee: National Applied Research Laboratories, Hsinchu (TW)

( * ) Notice: Subject to any disclaimer, the term of this patent is extended or adjusted under 35 U.S.C. 154(b) by 131 days.

(21) Appl. No.: 18/077,244

(22) Filed: Dec. 8, 2022

(65) Prior Publication Data
US 2023/0186140 A1     Jun. 15, 2023

Related U.S. Application Data

(60) Provisional application No. 63/288,545, filed on Dec. 11, 2021.

(51) Int. Cl.
  *G06N 10/70*  (2022.01)
  *G06F 11/00*  (2006.01)
  *G06N 10/00*  (2022.01)

(52) U.S. Cl.
  CPC ........... *G06N 10/70* (2022.01); *G06F 11/004* (2013.01); *G06N 10/00* (2019.01)

(58) Field of Classification Search
  CPC ....... G06N 10/70; G06N 10/00; G06F 11/004
  See application file for complete search history.

(56) References Cited

U.S. PATENT DOCUMENTS

| | | | |
|---|---|---|---|
| 11,706,016 B2* | 7/2023 | Su | H04L 9/3066 |
| | | | 380/44 |
| 11,728,966 B2* | 8/2023 | Su | G06N 10/60 |
| | | | 380/44 |

(Continued)

OTHER PUBLICATIONS

Grimsmo et al., Quantum computing with rotation-symmetric bosonic codes, Sep. 6, 2019, IEEE, pp. 1-31. (Year: 2019).*

*Primary Examiner* — John J Tabone, Jr.
(74) *Attorney, Agent, or Firm* — Amin, Turocy & Watson, LLP (57) ABSTRACT

A method of constructing a procedural threshold in quotient algebra partition-based fault tolerance quantum computation, which is based on the framework of quotient algebra partition (QAP) applied in the fault tolerance quantum computation (FTQC), wherein an n-qubit fault tolerant encode of a k-qubit quantum gate M, is feasible to a threshold, wherein the method comprises: preparing a quantum code, with a stabilizer; creating an n-qubit encoding, in the quantum code, and obtaining an n-qubit fault tolerant encode of M; factorizing each encoded component, of this n-qubit fault tolerant encode; and producing a detection-correction operator by placing n-k ancilla qubits with the original system of n qubits, wherein the detection-correction operator comprises a conditional detection operator and a conditional correction operator to remove r-qubit spinor error. In terms of this invention, a fault-tolerant computation is conducted by the following criteria given a threshold $0<\delta_{th}<1$: a qubit keeps unchanged if it has the fidelity $>\delta_{th}$ and needs an error-correction if it has the fidelity $<\delta_{th}$. Based on this concept, a fault tolerant method is constructed to be feasible to practical experiments composed of noisy systems, leading to scalable fault tolerance quantum computation.

16 Claims, 8 Drawing Sheets

(56) References Cited

U.S. PATENT DOCUMENTS

| 11,923,870 B2* | 3/2024 | Su | G06N 10/70 |
| 2022/0131558 A1* | 4/2022 | Su | G06N 10/70 |
| 2023/0128727 A1* | 4/2023 | Su | H04L 9/008 |
| | | | 380/44 |
| 2023/0131601 A1* | 4/2023 | Su | H04L 9/3066 |
| | | | 380/44 |
| 2023/0186140 A1* | 6/2023 | Su | G06N 10/70 |
| | | | 714/47.1 |

* cited by examiner

METHOD OF PROCEDURAL THRESHOLDS IN QAP-BASED FAULT TOLERANCE QUANTUM COMPUTATION

RELATED APPLICATIONS

The present application claims the priority of U.S. Provisional Patent Application No. 63/288,545 filed on Dec. 11, 2021, the disclosure of which is hereby incorporated by reference herein in its entirety.

BACKGROUND OF THE INVENTION

1. Field of the Invention

The present disclosure generally relates to a method of quotient algebra partition-based fault tolerance quantum computation, particularly, to method of QAP fault tolerance quantum computation combined with procedural threshold.

2. Description of the Related Art

Due to the uncertainty of a quantum system, when the quantum computation is conducted in the quantum system, the qubit is so susceptible to the environment that its quantum coherence would be destroyed, which leads an unreliable computation result attributed to errors occurring with high probabilities.

The primary concept of fault tolerance quantum computation is that the errors in the computation can be precisely detected and corrected under the circumstance that the quantum state is encoded to achieve the exact solution, no matter how long the computation is. Therefore, fault tolerance quantum computation is deemed to be a solution for the errors in the quantum computation.

However, in current scheme of the concept of fault tolerance quantum computation, it has not been considered that in an encoded system, after applications of different numbers of quantum gates are performed for the qubits, the fidelities of qubits change due to the different error rates. The qubit-fidelity reflects whether the qubit remains its coherent state, which means if a qubit fidelity is lower than a certain threshold, it is more likely that an error correction would be performed to prevent from the qubit decoherence. Because of the assumption of the current scheme of the fault tolerance quantum computation, the error rates of all qubits in encoded state are identical, which means different qubit-fidelities among qubits, applied by quantum gates, would not be shown during the computation. Consequently, the choice of the quantum codes would be limited. Meanwhile, the design of the fault tolerance operator must fulfill the requirement of the transversal gate and the qualified fault tolerance operators are so rare, so the methods can implement fault tolerance with significant overheads which makes the achievement of the scalable quantum computation difficult.

Therefore, how to provide a scalable fault tolerance quantum computation becomes an urgent problem to be solved.

SUMMARY OF THE INVENTION

The present inventive concept provides a method of procedural thresholds in QAP-based fault tolerance quantum computation. The methodology of the present invention may implement any fault tolerance operator of any quantum gate in any quantum code. The present invention may conduct a fault tolerance computation of the error detection and the error correction in fully parallelism and factor in the differentiation between the error rate of the qubit.

In light of achieving the foregoing desired result, the present inventive concept provides a method of constructing a procedural threshold in quotient algebra partition-based fault tolerance quantum computation, which is based on the framework of quotient algebra partition (QAP) applied in the fault tolerance quantum computation (FTQC), wherein an n-qubit fault tolerant encode of a k-qubit quantum gate, M, is feasible to a threshold $\delta_{th}$, and $0<\delta_{th}<1$, wherein the method comprises:

S1. preparing a quantum code, [n, k, C], with a stabilizer, C, wherein let n=k+r+l;

S2. creating an n-qubit encoding, $Q_{en}$, in the quantum code, letting $\mathcal{M} = I_{2^{n-k}} \otimes M = \mathcal{M}_1 \mathcal{M}_2 \ldots \mathcal{M}_J$; $\mathcal{M}_i = I_{2^{n-k}} \otimes M_i$, $1 \leq i \leq J$, and obtaining an n-qubit fault tolerant encode $U_{en}$;

S3. factorizing each encoded component, $\overline{\mathcal{M}_i}$, of the n-qubit fault tolerant encode $U_{en}$, so that $\overline{\mathcal{M}_i} = (\mathcal{R}_{r+1,p(r+1)}^{(i)} \mathcal{R}_{n,p(n)}^{(i)}) + \mathcal{R}_0^{(i)} (\mathcal{R}_{r+1,p(r+1)}^{(i)} \mathcal{R}_{r+2,p(r+2)}^{(i)} \ldots \mathcal{R}_{n,p(n)}^{(i)})$, where the $\mathcal{R}_{g,p(g)}^{(i)}$ is an s-rotation or an identity, the $\mathcal{R}_0^{(i)}$ is an elementary generated by the s-rotations factorized from the encoded component $\overline{\mathcal{M}_i}$, wherein the number of the s-rotation is p(n) and p(g)∈{1, 2, . . . , r}, r+1≤g≤n; and S4. producing a detection-correction operator, $DC_h$, by placing n-k ancilla qubits in front of the n-qubits, wherein the detection-correction operator comprises a conditional detection operator and a conditional correction operator with r-qubit spinor error.

In an embodiment of the present inventive concept, the method further comprises 1≤r≤k and r≤l≤k in the step of S1.

In an embodiment of the present inventive concept, the stabilizer is defined as $C=\{S_{\alpha_u}^{\zeta_u} \otimes I_{2^l} \otimes I_{2^k}, S_{\alpha'_v}^{\zeta'_v} \otimes S_{\beta_v}^{\eta_v} \in \text{su}(2^r) \otimes \text{su}(2^l) \otimes \text{su}(2^k) : u=1, 2, \ldots, r; v=1, 2, \ldots, l; \zeta'_v \cdot \alpha_u + \zeta_u \cdot \alpha'_v = 0\}$, and r≤l≤Jk.

In an embodiment of the present inventive concept, the fault tolerant encode is defined as $U_{en} = Q_{en} \mathcal{M} Q_{en}^\dagger = \overline{\mathcal{M}_1 \mathcal{M}_2} \ldots \overline{\mathcal{M}_J}$.

In an embodiment of the present inventive concept, in the step of S2, the encoded component $\overline{\mathcal{M}_i}$ is defined as $\overline{\mathcal{M}_i} = Q_{en} \mathcal{M}_i Q_{en}^\dagger$.

In an embodiment of the present inventive concept, the detection-correction operator $$DC_h = \prod_{u=1}^{r} \wedge^{(n-k)}(S_u) \cdot \prod_{q=1}^{N_E} \wedge^{(n-k)}(E_q).$$

In an embodiment of the present inventive concept, the conditional detection operator is defined as $\wedge^{(n-k)}(S_u)$, and $S_u = S_{\alpha_u}^{\zeta_u} \otimes I_{2^l} \otimes I_{2^k}$.

In an embodiment of the present inventive concept, in the step of S4, the number of the r-qubit spinor error is $$N_E = \sum_{u=1}^{r} 3 \binom{r}{u}.$$

In an embodiment of the present inventive concept, in the r qubits in the quantum code, if the encoded fidelity is lower than the threshold $\delta_{th}$, then an error correction is conducted;

and if the encoded fidelity is higher than or equals to $\delta_{th}$, then an error correction is not conducted.

The present inventive concept provides a method of procedural thresholds in QAP-based fault tolerance quantum computation. It can be determined by the method that whether the error detection and the error correction should be conducted in the computation process in the encoded system based on the criterion that whether the qubit fidelity is lower than the threshold. the method of the present inventive concept is able to perform the fault tolerance operators in any quantum and detect the errors exactly and reduce the computation depth and optimize the cost for the optimization of the error detection and error correction to achieve the scalable quantum computation.

BRIEF DESCRIPTION OF THE DRAWINGS

FIG. 4 is a schematic diagram of a circuit of s-rotation $$R_a^\zeta\left(\frac{\pi}{4}\right) \in SU(2^n)$$

of the present inventive concept;

DETAILED DESCRIPTION

The present inventive concept is described by the following specific embodiments. Those with ordinary skills in the arts can readily understand other advantages and functions of the present inventive concept after reading the disclosure of this specification. Any changes or adjustments made to their relative relationships, without modifying the substantial technical contents, are also to be construed as within the range implementable by the present inventive concept.

Moreover, the word "exemplary" or "embodiment" is used herein to mean serving as an example, instance, or illustration. Any aspect or design described herein as exemplary or an embodiment is not necessarily to be construed as preferred or advantageous over other aspects or designs. Rather, use of the word "exemplary" or "embodiment" is intended to present concepts and techniques in a concrete fashion.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Figure 1:
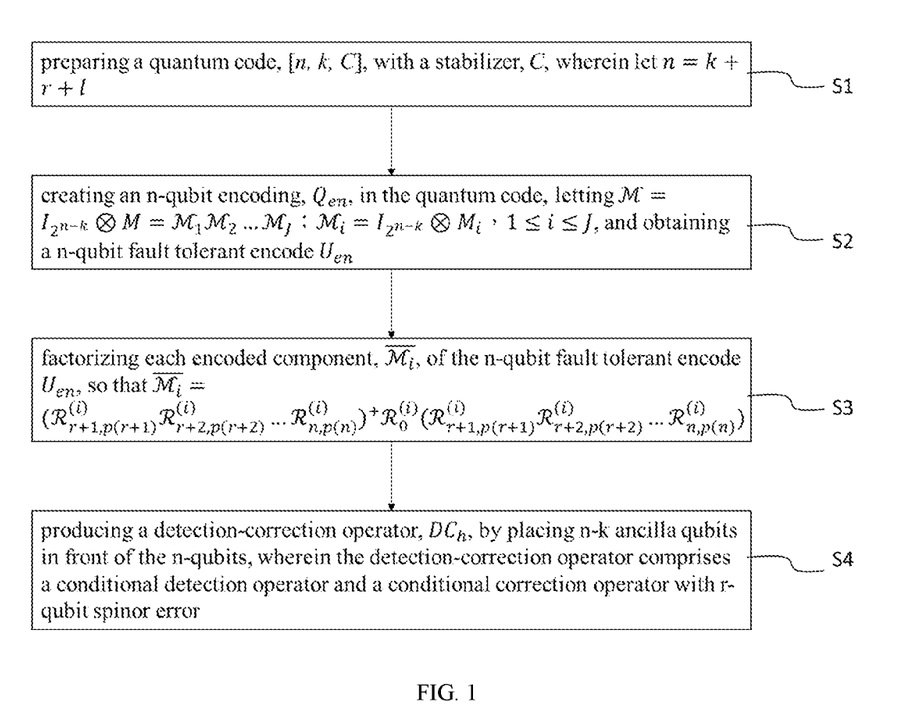
FIG. 1 is a flowchart of an embodiment of the method provided by the present inventive concept.
Figure 2:
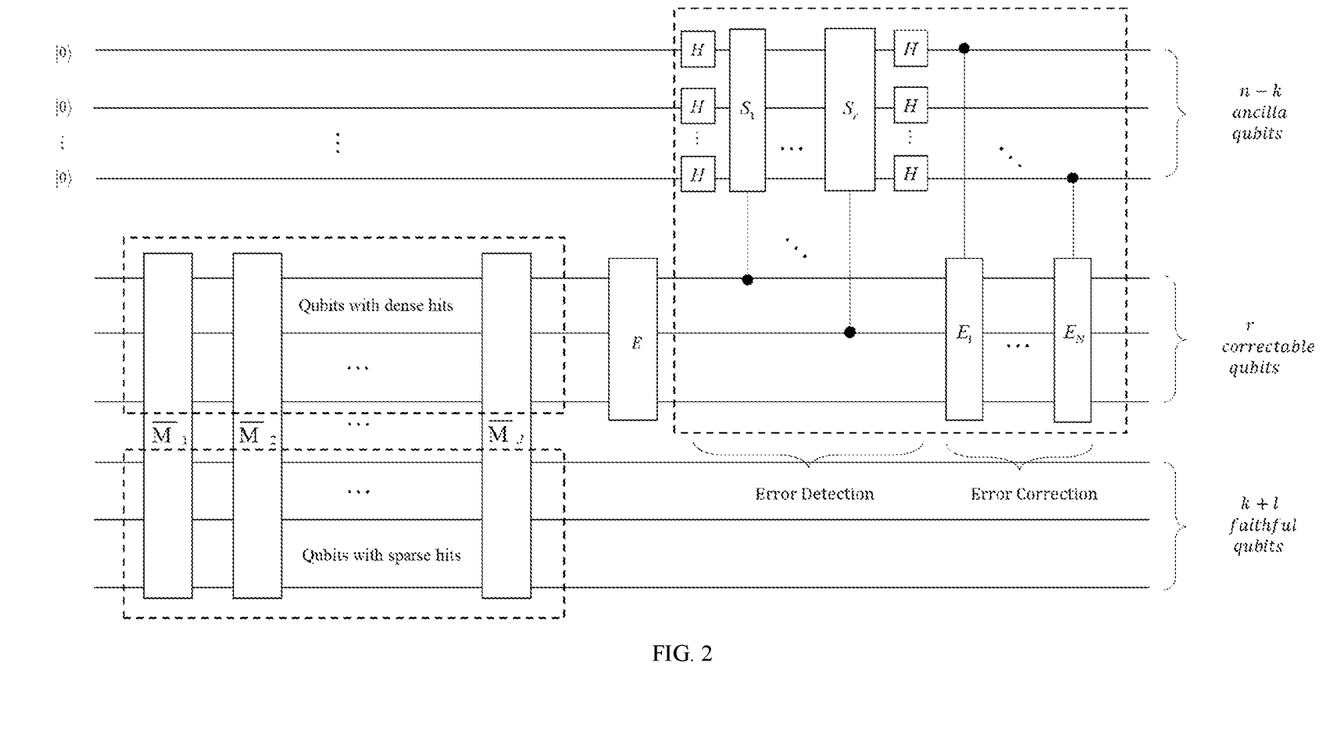
FIG. 2 is a schematic diagram of a quantum circuit for computing a fault tolerant encode of the method provided by the present inventive concept.

Please refer to FIGS. 1 and 2. FIG. 1 is a flowchart of an embodiment of the method provided by the present inventive concept and FIG. 2 is a schematic diagram of a quantum circuit for computing a fault tolerant encode of the method provided by the present inventive concept. The present inventive concept provides a method of constructing a procedural threshold in quotient algebra partition-based fault tolerance quantum computation, which is based on the framework of quotient algebra partition (QAP) applied in the fault tolerance quantum computation (FTQC), wherein an n-qubit fault tolerant encode of a k-qubit quantum gate, M, is feasible to a threshold $\delta_{th}$, and $0<\delta_{th}<1$, wherein the method comprises:

S1. preparing a quantum code, [n, k, C], with a stabilizer, C, wherein let n=k+r+l;

S2. creating an n-qubit encoding, $Q_{en}$, in the quantum code, letting $\mathcal{M}=I_{2^{n-k}}\otimes M=\mathcal{M}_1\mathcal{M}_2 \ldots \mathcal{M}_J$; $\mathcal{M}_i=I_{2^{n-k}}\otimes M_i$, $1\leq i\leq J$, and obtaining an n-qubit fault tolerant encode $U_{en}$;

S3. factorizing each encoded component, $\overline{\mathcal{M}_i}$, of the n-qubit fault tolerant encode $U_{en}$, so that $\overline{\mathcal{M}_i}=(\mathcal{R}_{r+1,p(r+1)}^{(i)}\mathcal{R}_{r+2,p(r+2)}^{(i)} \cdot \cdot \cdot \mathcal{R}_{n,p(n)}^{(i)})+\mathcal{R}_0^{(i)}$
$(\mathcal{R}_{r+1,p(r+1)}^{(i)}\mathcal{R}_{r+2,p(r+2)}^{(i)} \ldots \mathcal{R}_{n,p(n)}^{(i)})$, where the $\mathcal{R}_{g,p(g)}^{(i)}$ is an s-rotation or an identity, the $\mathcal{R}_0^{(i)}$ is an elementary generated by the s-rotations factorized from the encoded component $\overline{\mathcal{M}_i}$, wherein the number of the s-rotation is p(n) and p(g)∈{1, 2, ..., r}, r+1≤g≤n; and S4. producing a detection-correction operator, $DC_h$, by placing n-k ancilla qubits in front of the n-qubits, wherein the detection-correction operator comprises a conditional detection operator and a conditional correction operator with r-qubit spinor error.

In an embodiment of the present inventive concept, the method may further comprise 1≤r≤k and r≤l≤k in the step of S1.

In an embodiment of the present inventive concept, the stabilizer may be defined as $C=\{S_{\alpha_u}^{\zeta_u}\otimes I_{2^l}\otimes I_{2^k}, S_{\alpha'_v}^{\zeta'_v}\otimes S_{\beta_v}^{\eta_v}\otimes S_{\gamma_v}^{\xi_v}\in su(2^r)\otimes su(2^l)\otimes su(2^k):u=1, 2, \ldots, r; v=1, 2, \ldots, 1; \zeta'_v\cdot\alpha_u+\zeta_u\cdot\alpha'_v=0\}$, and r≤Jk.

In an embodiment of the present inventive concept, the fault tolerant encode may be defined as $U_{en}=Q_{en}\mathcal{M}\ Q_{en}^\dagger=\overline{\mathcal{M}_1\mathcal{M}_2} \ldots \overline{\mathcal{M}_J}$.

In an embodiment of the present inventive concept, in the step of S2, the encoded component $\overline{\mathcal{M}_i}$ may be defined as $\overline{\mathcal{M}_i}=Q_{en}\mathcal{M}\ Q_{en}^\dagger$.

In an embodiment of the present inventive concept, the detection-correction operator $$DC_h = \prod_{u=1}^{r} \wedge^{(n-k)}(S_u)\cdot\prod_{q=1}^{N_E}\wedge^{(n-k)}(E_q).$$

In an embodiment of the present inventive concept, the conditional detection operator may be defined as $\wedge^{(n-k)}(S_u)$, and $S_u=S_{\alpha_u}^{\zeta_u}\otimes I_{2^l}\otimes I_{2^k}$.

In an embodiment of the present inventive concept, in the step of S4, the number of the r-qubit spinor error may be $$N_E = \sum_{u=1}^{r} 3\binom{r}{u}.$$

In an embodiment of the present inventive concept, in the r qubits in the quantum code, if the encoded fidelity is lower than the threshold $\delta_{th}$, then an error correction may be conducted; and if the encoded fidelity is higher than or equals to $\delta_{th}$, then an error correction may not be conducted.

According to the present inventive concept, in a scheme of QAP, a partition structure [k+r+l, k, C] composed of a stabilizer C and its cosets is prepared. The partition structure is a quantum code required for the present inventive concept to conduct the fault tolerance computation. A k-qubit quantum state and a k-qubit quantum gate are encoded as an encoded state with n=k+r+l qubits and a fault tolerance operator, respectively. Considering the error rates between the qubits are quite differentiated, the qubit fidelities are lower than the threshold and the error detection may occur in the first r encoded qubits. The fidelities of the last n-r qubits are far away higher than the threshold, so the error detection is required to be conducted for the first r qubits.

According to the present inventive concept, the quantum codes applied in the current schemes of the design of the fault tolerance mainly is Steane code and Reed-Muller code. The former one provides fault tolerance operators for Hadamard gate and controlled-not gate; and the latter one provides fault tolerance operator for $$\frac{\pi}{8}$$

gate. The ratio of physical to logical qubits can approach 105:1. Furthermore, at least 100 multiqubit operators whose parallelism rates are quite different to each other, are required to conduct the error, which results a pretty high cost for the fault tolerance computation. The quantum code, [k+r+l, k, C], provided by the present inventive concept may implement any fault tolerance operator of any quantum gate and the ratio of physical to logical qubits is close to one. Specifically, in the current schemes, one logic qubit of fault tolerance computation takes about 105 to 1000 physical qubits to conduct. However, the fault tolerance computation of one logic qubit can be conducted by one or two physical qubits which makes the achievement of the scalable quantum computation possible. For example, it is estimated that about 23 million physical qubits are required to decrypt 2048-bit RSA QFT (Quantum Fourier Transform). This is almost impossible to implement by the current methods. However, it is estimated that less than five thousand physical qubits are required to decrypt 2048-bit RSA QFT by the present inventive concept.

Circuit Design of Fault Tolerant Encode

Any fault tolerant encode of an arbitrary k-qubit action $M \in SU(2^k)$ in a quantum code [n, k, C] may be in a form of $U_{en} = Q_{en} \mathcal{M} Q_{en}^{\dagger}$, where $\mathcal{M}$ is a tensor product which may be written as $\mathcal{M} = I_{2^{n-k}} \otimes M$, $Q_{en}$ is a encoding. The realization of the fault tolerant computation of M is accomplished in a certain number of rounds, where $M = \Pi_{h=1}^{P} M_h = M_h \ldots M_2 M_1$, and M is factorized into a product of P components, $M_h$. Each $M_h$ is either a composition of basic operations or a single basic operation. As essential elements to build an arbitrary unitary action, the basic operations are selected from a so-called universal set of gates, such as Hadamard gate H, $$\frac{\pi}{8} - \text{gate } T$$

and controlled-not gate CNOT from a universal set adopted in current design of fault tolerance computation. The methodology of fault tolerance computation, as well as the framework of QAP provide a recursive procedure to acquire all admissible factorization of M algorithmically and exhaustively. Based on s-rotation, the action M can be factorized into a composition of basic operations and can be further reduced to rotations of lower qubits, e.g., 1-qubit and 2-qubit S-rotation. In fact, the infinite universal sets of basic operations admit building a s-rotation construction in a framework of QAP implies optimal quantum circuits of M under various constraints.

Figure 3:
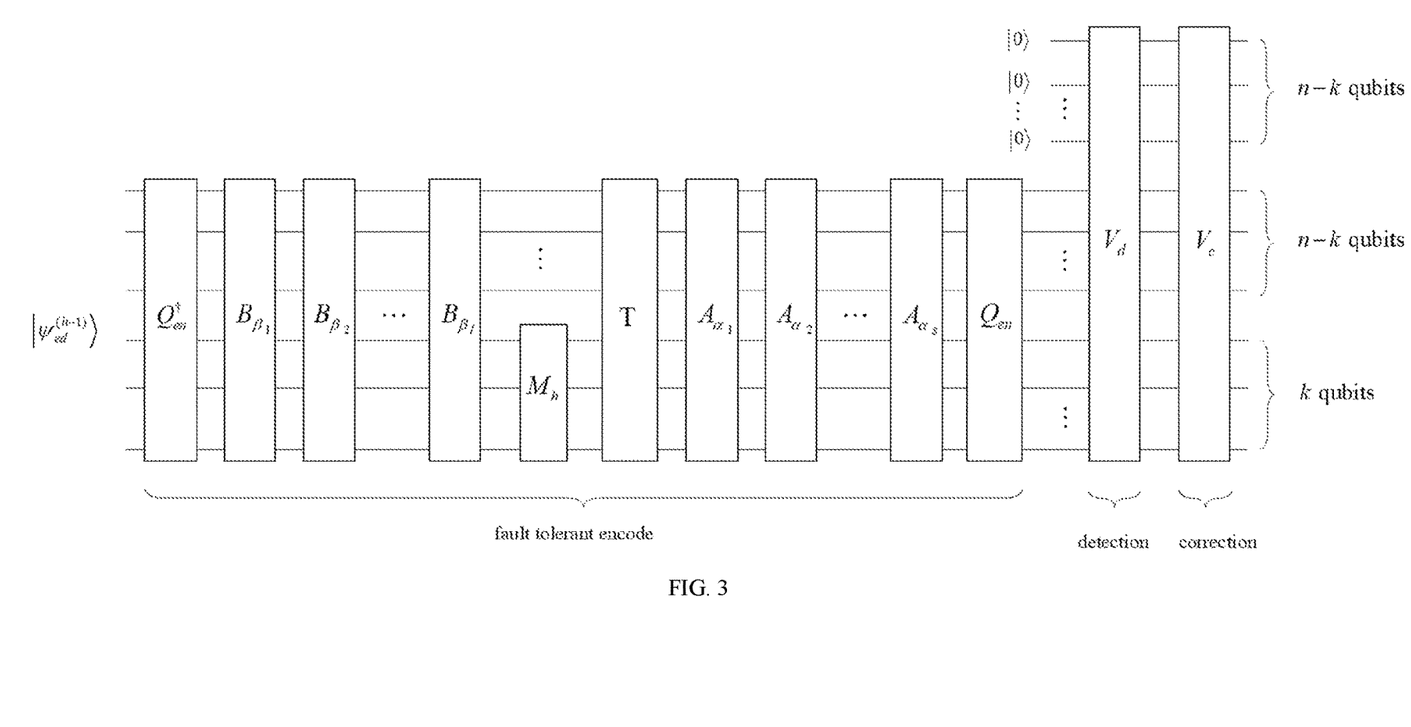
FIG. 3 is a schematic diagram of a circuit for a fault tolerance computation of the present inventive concept.

Please refer to FIG. 3 which is a schematic diagram of a circuit for a fault tolerance computation of the present inventive concept. In the QAP-based design, the fault tolerance computation of M is realized by performing the P-th encode $U_{ed,h} = Q_{en} \mathcal{A} \mathcal{T} I_{2^{n-k}} \otimes M_h \mathcal{B} Q_{en}^{\dagger}$ of basic operations $M_h$ in order. In consideration of a k-qubit encoded state $|\psi\rangle$ and the h-th basic operation $M_h \in SU(2^k)$ in M, the circuit shown in FIG. 3 represents the fault tolerance computation of the h-th round $U_{ed,h}$ in the code [n, k, C]. In this circuit, $|\psi_{ed}^{(h-1)}\rangle = Q_{en}|0\rangle \otimes M_{h-1} \ldots M_2 M_1 |\psi\rangle$ is the input state; the correction operation (校正算子) $\mathcal{B} = \Pi_{q=1}^{l} B_{\beta_q}$ is composed of operators $B_{\beta_q}$ with syndrome $\beta_q \in Z_2^{n-k}$ and each of $B_{\beta_q}$ is a component of one input coset); the correction operation $\mathcal{A} = \Pi_{v=1}^{s} A_{\alpha_v}$ is composed of operators $A_{\alpha_u}$ with syndrome $\alpha_u \in Z_2^{n-k}$ and each of $A_{\alpha_u}$ is a component of one output coset); the transfer amplitude $\mathcal{T}$ is a unitary operation; the operator $V_d$ is for error detection; and the operator $V_c$ is for error correction.

Figure 4:
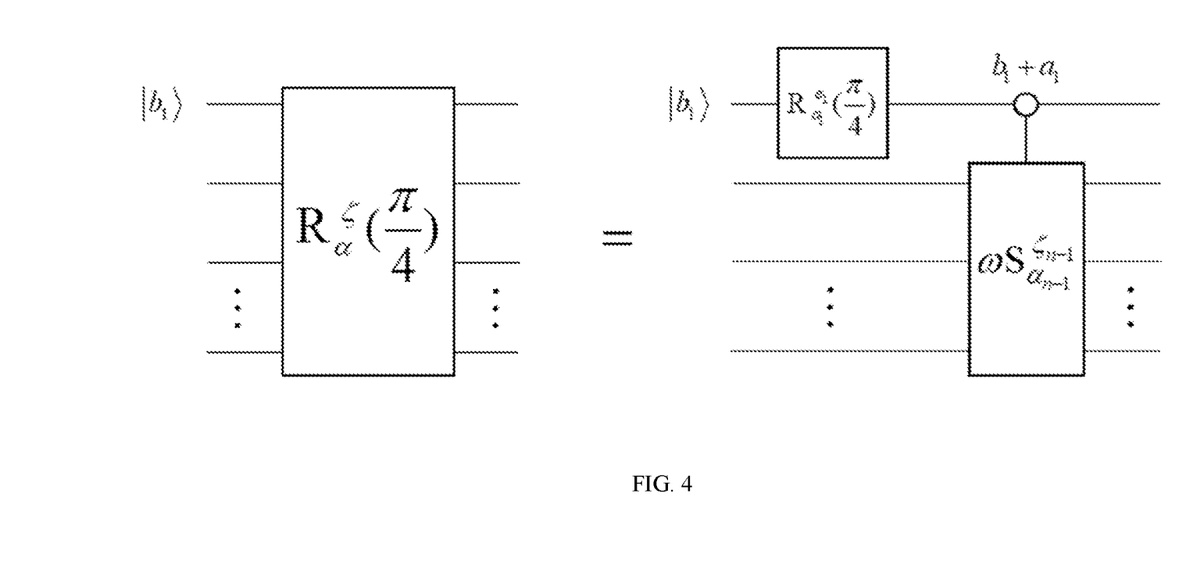
Figure 5:
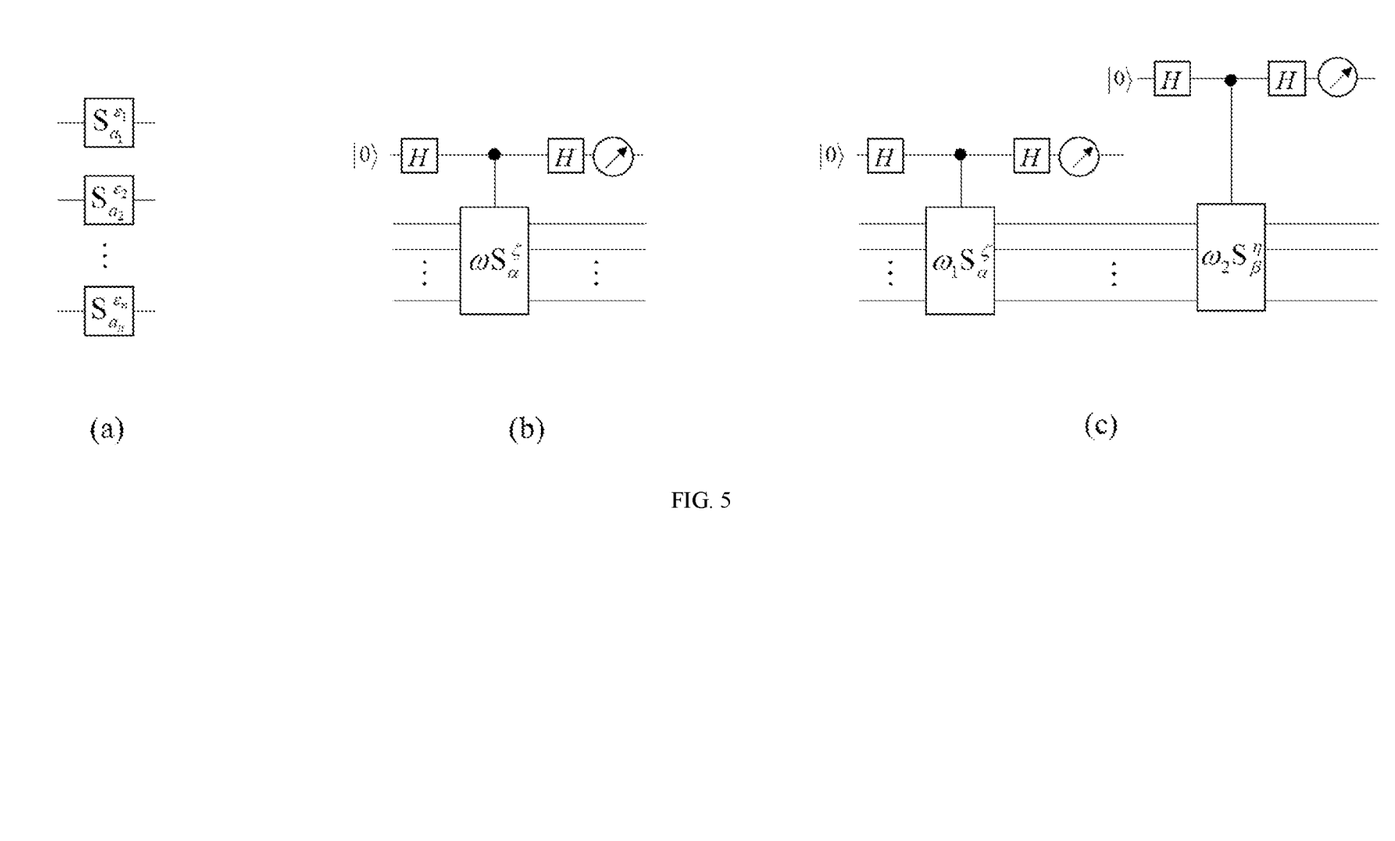
FIG. 5 is a schematic diagram of a circuit of three scenarios of a component of $Q_p$ of the encoded operation $Q_{en}=\Pi_{p=1}^{n-k}Q_p$ of the present inventive concept.

Please refer to FIGS. 4 and 5. FIG. 4 is a schematic diagram of a circuit of s-rotation $$R_{\alpha}^{\zeta}\left(\frac{\pi}{4}\right) \in SU(2^n)$$

of the present inventive concept and each component of $Q_p$ of the encode $Q_{en} = Q_1 Q_2 \ldots Q_{n-k}$ is illustrated by the circuit of three scenarios shown in FIG. 5, where $1 \leq p \leq n-k$. In FIG. 4, a controlled gate $\wedge_1(\omega S_\alpha^\zeta)$ fulfills $\wedge_1(\omega S_\alpha^\zeta)|0\rangle \otimes |\psi\rangle$ and $\wedge_1(\omega S_\alpha^\zeta)|1\rangle \otimes |\psi\rangle = |1\rangle \otimes (\omega S_\alpha^\zeta)|\psi\rangle$ with the measurement of an ancilla qubit on the axis $|0\rangle$. Specifically, in the circuits shown in FIG. 5(a), $Q_p = S_{\alpha=a_1 a_2 \ldots a_n}^{\zeta=\varepsilon_1 \varepsilon_2 \ldots \varepsilon_n}$; in the circuits shown in FIG. 5(b), $$Q_p = R_{\alpha}^{\zeta}\left(\pm\frac{\pi}{4}\right);$$

and in the circuits shown in FIG. 5(c), $$Q_p = R_{\alpha}^{\zeta}\left(\frac{\pi}{4}\right) R_{\beta}^{\eta}\left(\pm\frac{\pi}{4}\right),$$

where $\eta \cdot \alpha + \zeta \cdot \beta = 1$.

Figure 6:
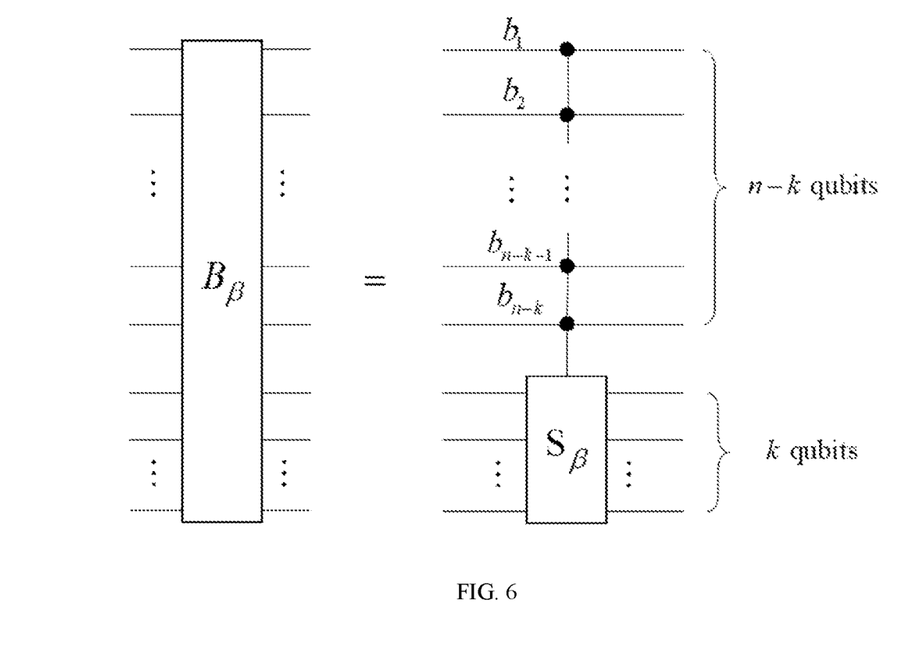
FIG. 6 is a schematic diagram of a circuit of $B_\beta$ of the present inventive concept.
Figure 7:
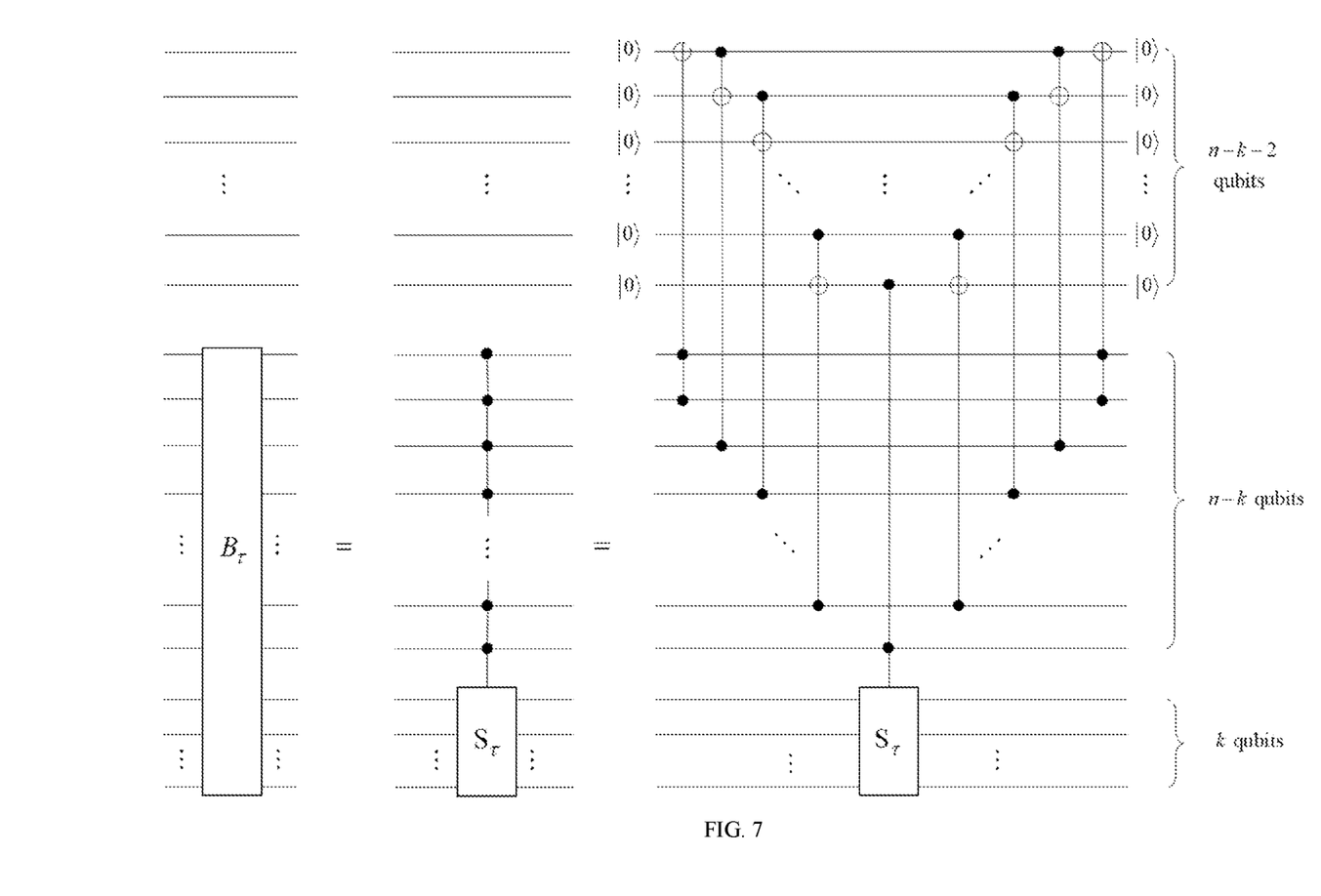
FIG. 7 is a schematic diagram of a circuit of $B_T$ of the present inventive concept.

Please refer to FIGS. 6 and 7. In terms of s-rotations, each component $B_\beta$ of $\mathcal{B}$ with a corrector (校正子) $\beta$ and a coset error $\mathbb{S}_\beta \in su(2^k)$, costs a number $2^{n-k}$ of operations. Whereas, if $B_\beta = P_{n-k}(\mathbb{S}_\beta)$ is rephrased into a controlled gate shown in FIG. 6 with the first n−k qubits as control bits and the last k qubits as target bits, then the complexity is effectively reduced. If the first n−k qubits are in the state of $|\beta\rangle = |b_1 b_2 \ldots b_{n-k}\rangle$, the last k qubits is applied by the spinor $\mathbb{S}_\beta \in su(2^k)$ of coset error. In this embodiment, the controlled gate $B_\beta$ can be factorized into a composition of $O((n-k)^2)$ Toffoli gates through the recursive application of the circuit reductions. Besides, in addition to a number n−k−2 of ancilla qubits, the complexity of $B_\beta$ reduces to a linear cost. As shown in FIG. 7, $B_\beta$ is composed of O(n) Toffoli gates and a single controlled-controlled gate $\wedge_2(\mathbb{S}_\beta)$. Here, the gate $\wedge_2(\mathbb{S}_\beta)$ obeys $\wedge_2(\mathbb{S}_\beta)|x_1 x_2\rangle \otimes |\phi\rangle = (-1)^{x_1 \cdot x_2 = 1}|x_1 x_2\rangle \otimes \mathbb{S}_\beta|\phi\rangle$ and $\wedge_2(\mathbb{S}_\beta)|x_1 x_2\rangle \otimes |\phi\rangle = (-1)^{x_1 \cdot x_2 = 0}|x_1 x_2\rangle \otimes \mathbb{S}_\beta|\phi\rangle$, where $\mathbb{S} \in su(2^k)$ is a coset error of corrector $\mathcal{T}$ and a k-qubit encoded state $|\phi\rangle$, $x_1, x_2 \in Z_2$. Each of the Toffoli gates are represented by five 2-qubit controlled gates and the same numbers of 2-qubit s-rotations, which allows $B_\beta$ to be factorized into a linear cost of s-rotations. A similar circuit is used to illustrate each component $A_\alpha$ of the operation of the output coset $\mathcal{A} = \Pi_{\alpha \in Z_2^{n-k}} A_\alpha$.

Figure 8:
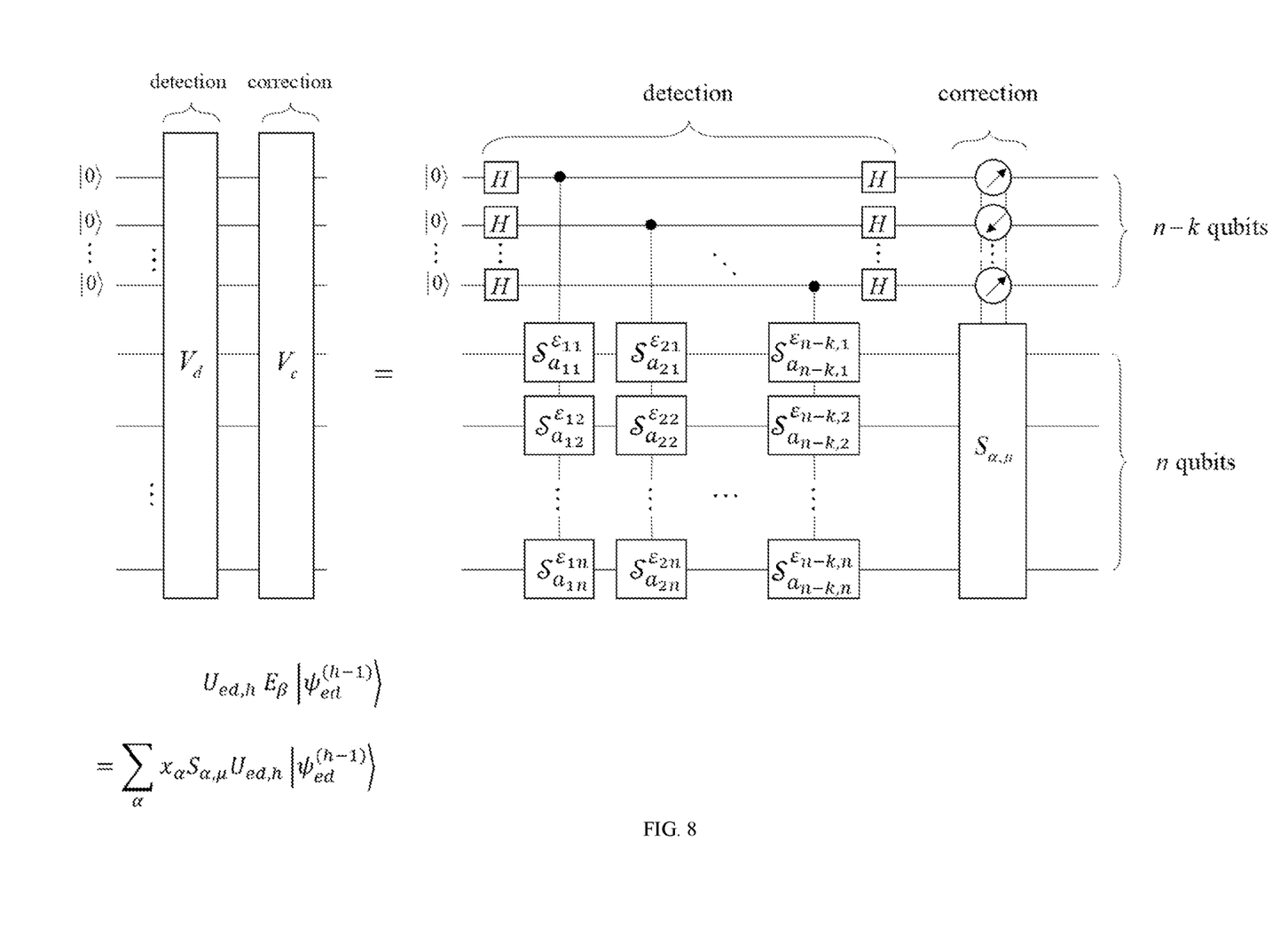
FIG. 8 is a schematic diagram of a circuit for error detection and error correction of the method provided by the present inventive concept.

Please refer to FIG. 8 which is a schematic diagram of a circuit for error detection and error correction of the method provided by the present inventive concept. there are n−k ancilla qubits, and the error-correction $V_c$ follows behind the detection-correction operator $V_d$ which is constituted by 2(n−k) parallel Hadamard gates and n−k multi-target controlled gates $\wedge_1(S_r)$ with detection operators, $S_r = S_{a_{r1}}^{\epsilon_{r1}} \otimes S_{a_{r2}}^{\epsilon_{r2}} \otimes \ldots \otimes S_{a_{rm}}^{\epsilon_{rm}} \in su(2^n)$, from an independent set $S_c = \{S_r: 1 \leq r \leq n-k \subset C\}$. The error-correction $V_c$ is accomplished by performing a measurement to obtain a corrector $\alpha \in Z_2^{n-k}$ first and then applying a correction spinor $S_{\alpha,v} \in W_{a,\mu} \subset \Gamma_\alpha$ of the same corrector to obtain an uncorrupted state, $U_{ed,h}|\psi_{ed}^{(h-1)}\rangle$.

The forementioned circuits demonstrate the ideal implementation of a QAP-based fault tolerance computation. The schemes of the circuit designs are flexible and customizable in various realizable quantum computing hardware. A practical design of a circuit being subject to physical constraints, such as coherence time, qubit configuration and qubit embedding, is achievable by adding structural gates, e.g., SWAP gates, properly.

Threshold Fault Tolerance

A scheme of scalable fault tolerance toward a practical quantum computer is demonstrated as follows.

For a k-qubit action $M \in SU(2^k)$, the concept of the threshold fidelity $0 < \delta_{th} < 1$ indicates that there exists at least one qubit with fidelity $< \delta_{th}$ in the computation of M. In the encoded computation of M by a partition structure [n, k, C], each encoded qubit with its fidelity $< \delta_{th}$ must be error correctable.

In a partition structure [n, k, C], the fault tolerant encode of a k-qubit action M may be expressed as $U_{en} = Q_{en} \mathcal{A T M B} Q_{en}^\dagger$, where encoding $Q_{en} \in SU(2^n)$ and $\mathcal{M} = I_{2^{n-k}} \otimes M$. The operator of the output coset $\mathcal{A}$ and the transfer amplitude $\mathcal{T}$ are selected to be identity $I_{2^n}$, thereby obtaining a simplified code (简化編碼) $U_{en} = Q_{en} \mathcal{M B} Q_{en}^\dagger$. In terms of basic operations, the operator of input coset $\mathcal{B} = \Sigma_{\beta \in Z_2^{n-k}} |\beta\rangle\langle\beta| \otimes \mathbb{S}_\beta$ is the main cost of $U_{ed}$, wherein a block-diagonal matrix contains all cosets of errors, $\mathbb{S}_\beta = (-i)^{\eta\bar{\beta} \cdot \beta} S_\beta^{\eta\bar\beta} \in su(2^k)$. If $\mathcal{B}$ embraces more cosets equaling the identity $I_{2^k}$, it is obvious that the cost of $U_{ed}$ reduced, and furthermore, it could induce the condition $\mathcal{B} = I_{2^n}$ for an optimal cost of the encode. Note that the condition $\mathcal{B} = I_{2^n}$ is not employed in a partition to correct spinor errors of weight ≥1.

A k-qubit action M with a threshold fidelity $\delta_{th}$, $0 < \delta_{th} < 1$, is given. A partition structure [n, k, C] exists, where M admits a fault tolerant encode feasible to $\delta_{th}$.

Provided a k-qubit action M with a threshold fidelity $\delta_{th}$, $0 < \delta_{th} < 1$, which is composed of J elementary s-rotations. A partition structure [n, k, C] exists, where M admits a fault tolerant encode feasible to $\delta_{th}$ which has a computation depth ≤2J(n−r) and the cost of error-correction ≤Jr.

As mentioned above, the present inventive concept provides a method of procedural thresholds in QAP-based fault tolerance quantum computation. It is a general methodology of fault tolerance quantum computation, FTQC, in the framework Quotient Algebra Partition, QAP, combined with the concept called procedural thresholds. When an operator M is acting on a quantum system, the qubit fidelity of at least one qubit would be lower than the threshold. The operator and the system are encoded simultaneously and the encoded operator is performed in the encoded system. The fidelity of error-correctable qubit must be lower than the same threshold.

It can be determined by the method provided by the present inventive concept that whether the error detection and the error correction should be conducted in the computation process in the encoded system based on the criterion that whether the qubit fidelity is lower than the threshold. The inventive concept may perform the fault tolerance operators in any quantum and detect the errors exactly and may reduce the computation depth and optimize the cost for the optimization of the error detection and error correction, which brings many benefits to the achievement of the scalable quantum computation. In terms of this invention, a fault-tolerant computation is conducted by the following criteria given a threshold $0 < \delta_{th} < 1$: a qubit keeps unchanged if it has the fidelity $> \delta_{th}$ and needs an error-correction if it has the fidelity $< \delta_{th}$. Based on this concept, a fault tolerant method is constructed to be feasible to practical experiments composed of noisy systems, leading to scalable fault tolerance quantum computation.

The foregoing descriptions of the detailed embodiments are only illustrated to disclose the features and functions of the present inventive concept and not restrictive of the scope of the present inventive concept. It should be understood to those in the art that all modifications and variations according to the spirit and principle in the disclosure of the present inventive concept should fall within the scope of the appended claims.

What is claimed is:

1. A computer-implemented method of constructing a procedural threshold in quotient algebra partition-based fault tolerance quantum computation, which is based on a framework of quotient algebra partition (QAP) applied in fault tolerance quantum computation (FTQC), wherein an n-qubit fault tolerant encode of a k-qubit quantum gate, M, is feasible to a threshold $\delta_{th}$, and $0 < \delta_{th} < 1$, wherein the method comprises:

S1. preparing a quantum code, [n, k, C], with a stabilizer, C, wherein let n=k+r+1, wherein each of k, r and I is an integer, respectively;

S2. creating an n-qubit encoding, $Q_{en}$, in the quantum code, letting $\mathcal{M} = I_{2^{n-k}} \otimes M = M_1 M_2 \ldots M_J$; $M_i = I_{2^{n-k}} \otimes M_i$, $1 \leq i \leq J$, $1 \leq i \leq J$, and obtaining an n-qubit fault tolerant encode $U_{en}$, wherein each of i and i is a positive integer, respectively;

S3. factorizing each encoded component, $\overline{\mathcal{M}_i}$, of the n-qubit fault tolerant encode $U_{en}$, so that $\overline{\mathcal{M}_i} = (\mathcal{R}_{r+1,p(r+1)}^{(i)} \mathcal{R}_{n,p(n)}^{(i)}) + \mathcal{R}_0^{(i)} (\mathcal{R}_{r+1,p(r+1)}^{(i)} \mathcal{R}_{r+2,p(r+2)}^{(i)} \ldots \mathcal{R}_{n,p(n)}^{(i)})$, where the $\mathcal{R}_{g,p(g)}^{(i)}$ is an s-rotation or an identity, the $\mathcal{R}_0^{(i)}$ is an elementary generated by the s-rotations factorized from the encoded component $\overline{\mathcal{M}_t}$, wherein the number of the s-rotation is p(n) and p(g)∈{1, 2, ..., r}, r+1≤g≤n, wherein g is an integer; and S4. producing a detection-correction operator, $DC_h$, by placing n-k ancilla qubits in front of the n-qubits, wherein the detection-correction operator comprises a conditional detection operator and a conditional correction operator with r-qubit spinor error.

2. The computer-implemented method of claim 1, further comprising 1≤r≤k and r≤l≤k in the step of S1.

3. The computer-implemented method of claim 2, wherein in the r qubits in the quantum code, if the encoded fidelity is lower than the threshold $\delta_{th}$, then an error correction is conducted; and if the encoded fidelity is higher than or equals to $\delta_{th}$, then an error correction is not conducted.

4. The computer-implemented method of claim 1, wherein the stabilizer is defined as C={$S_{\alpha_u}^{\zeta_u} \otimes I_{2^l} \otimes I_{2^k}$, $S_{\alpha'_v}^{\zeta'_v} \otimes S_{\beta_v}^{\eta_v} \otimes S_{\gamma_v}^{\xi_v}$ ∈ su($2^r$)⊗su($2^l$)⊗su($2^k$):u=1, 2, ..., r; v=1, 2, ..., l; $\zeta'_v \cdot \alpha_u + \zeta_u \cdot \alpha'_v = 0$}, and r≤l≤Jk.

5. The computer-implemented method of claim 4, wherein in the r qubits in the quantum code, if the encoded fidelity is lower than the threshold $\delta_{th}$, then an error correction is conducted; and if the encoded fidelity is higher than or equals to $\delta_{th}$, then an error correction is not conducted.

6. The computer-implemented method of claim 1, wherein the fault tolerant encode is defined as $U_{en} = Q_{en} \mathcal{M} Q_{en}^\dagger = \overline{\mathcal{M}_1 \mathcal{M}_2} \ldots \overline{\mathcal{M}_J}$.

7. The computer-implemented method of claim 6, wherein in the r qubits in the quantum code, if the encoded fidelity is lower than the threshold $\delta_{th}$, then an error correction is conducted; and if the encoded fidelity is higher than or equals to 8th, then an error correction is not conducted.

8. The computer-implemented method of claim 1, wherein in the step of S2, the encoded component $\overline{\mathcal{M}_t}$ is defined as $\overline{\mathcal{M}_t} = Q_{en} \mathcal{M}_i Q_{en}^\dagger$.

9. The computer-implemented method of claim 8, wherein in the r qubits in the quantum code, if the encoded fidelity is lower than the threshold $\delta_{th}$, then an error correction is conducted; and if the encoded fidelity is higher than or equals to $\delta_{th}$, then an error correction is not conducted.

10. The computer-implemented method of claim 1, wherein the detection-correction operator $DC_h =$ $$\prod_{u=1}^{r} \wedge^{(n-k)}(S_u) \cdot \prod_{q=1}^{N_E} \wedge^{(n-k)}(E_q).$$

11. The computer-implemented method of claim 10, wherein in the r qubits in the quantum code, if the encoded fidelity is lower than the threshold $\delta_{th}$, then an error correction is conducted; and if the encoded fidelity is higher than or equals to $\delta_{th}$, then an error correction is not conducted.

12. The computer-implemented method of claim 1, wherein the conditional detection operator is defined as $\wedge^{(n-k)}(S_u)$, and $S_u = S_{\alpha_u}^{\zeta_u} \otimes I_{2^l} \otimes I_{2^k}$.

13. The computer-implemented method of claim 12, wherein in the r qubits in the quantum code, if the encoded fidelity is lower than the threshold $\delta_{th}$, then an error correction is conducted; and if the encoded fidelity is higher than or equals to $\delta_{th}$, then an error correction is not conducted.

14. The computer-implemented method of claim 1, wherein in the step of S4, the number of the r-qubit spinor error is $$N_E = \sum_{u=1}^{r} 3 \binom{r}{u}.$$

15. The computer-implemented method of claim 14, wherein in the r qubits in the quantum code, if the encoded fidelity is lower than the threshold $\delta_{th}$, then an error correction is conducted; and if the encoded fidelity is higher than or equals to $\delta_{th}$, then an error correction is not conducted.

16. The computer-implemented method of claim 1, wherein in the r qubits in the quantum code, if the encoded fidelity is lower than the threshold $\delta_{th}$, then an error correction is conducted; and if the encoded fidelity is higher than or equals to $\delta_{th}$, then an error correction is not conducted.

* * * * *